US012598358B2

(12) United States Patent
Gupta

(10) Patent No.: US 12,598,358 B2
(45) Date of Patent: Apr. 7, 2026

(54) DYNAMIC SETTINGS ON A TELEVISION DEVICE

(71) Applicant: GOOGLE LLC, Mountain View, CA (US)

(72) Inventor: Shashank Gupta, Bangalore (IN)

(73) Assignee: GOOGLE LLC, Mountain View. (CA)

( * ) Notice: Subject to any disclaimer, the term of this patent is extended or adjusted under 35 U.S.C. 154(b) by 28 days.

(21) Appl. No.: 18/646,297

(22) Filed: Apr. 25, 2024

(65) Prior Publication Data

US 2025/0337995 A1 Oct. 30, 2025

(51) Int. Cl.
*H04N 21/485* (2011.01)
*H04N 21/25* (2011.01)
*H04N 21/258* (2011.01)
*H04N 21/431* (2011.01)

(52) U.S. Cl.
CPC ......... *H04N 21/485* (2013.01); *H04N 21/252* (2013.01); *H04N 21/25891* (2013.01); *H04N 21/4316* (2013.01)

(58) Field of Classification Search
CPC ............... H04N 21/485; H04N 21/252; H04N 21/25891; H04N 21/4316
See application file for complete search history.

(56) References Cited

U.S. PATENT DOCUMENTS 7,634,790 B2 * 12/2009 Finseth .............. H04N 21/6582
709/204
9,848,276 B2 * 12/2017 Lundell ................... H04W 4/50

2010/0013996 A1 * 1/2010 Kang ................. H04N 21/4345
348/553
2012/0173976 A1 7/2012 Herz et al.
2016/0156957 A1 6/2016 Yun
2017/0195736 A1 * 7/2017 Chai ................. H04N 21/4316
2019/0200076 A1 * 6/2019 Sanchesshayda ...........................
H04N 21/25891

FOREIGN PATENT DOCUMENTS

CN 104506956 A 4/2015

OTHER PUBLICATIONS

"How to Use the Quick Settings Feature", Samsung; https://www.samsung.com/in/support/tv-audio-video/2022-how-to-use-the-quick-settings-feature/, May 18, 2022, 3 pages.

* cited by examiner

*Primary Examiner* — Nnenna N Ekpo
(74) *Attorney, Agent, or Firm* — Brake Hughes Bellermann LLP

(57) ABSTRACT

A system may identify at least one dynamic setting for a television device by selecting at least one television setting from a plurality of television settings using a plurality of signals relating to setting usage history, the plurality of signals including a usage of the plurality of television settings by other users of television devices. A system may receive information that identifies the at least one dynamic setting. A system may display the at least one dynamic setting on a user interface of the television device, where the at least one dynamic setting can be displayed in a location that is different from a setting interface.

21 Claims, 4 Drawing Sheets

300

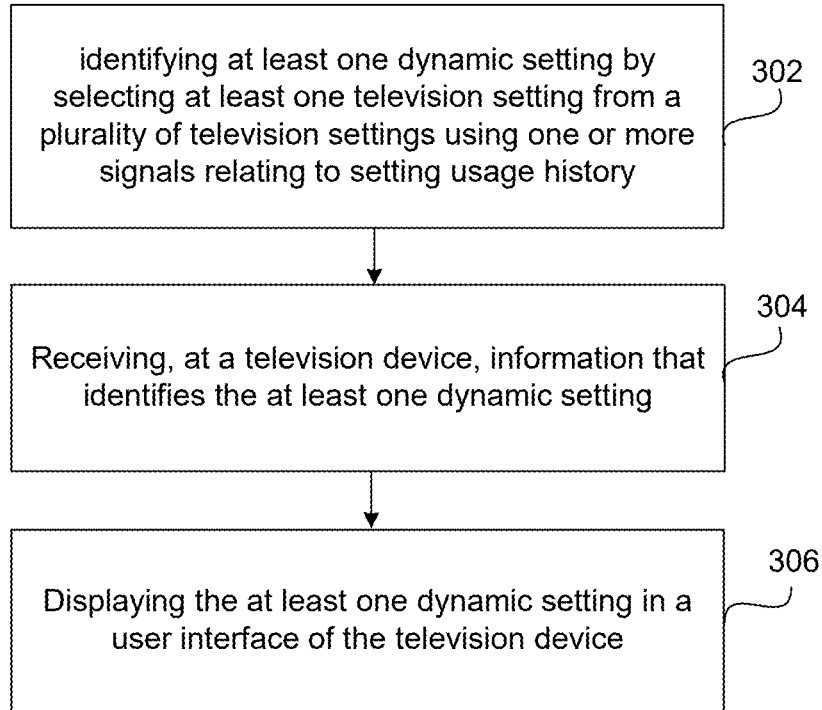

identifying at least one dynamic setting by
selecting at least one television setting from a
plurality of television settings using one or more
signals relating to setting usage history

302

Receiving, at a television device, information that
identifies the at least one dynamic setting

304

Displaying the at least one dynamic setting in a
user interface of the television device

DYNAMIC SETTINGS ON A TELEVISION DEVICE

BACKGROUND

Some television devices and/or media applications provide a setting interface that allows users to find and adjust settings associated with displaying and/or viewing media content. In some examples, a television user may have to navigate through multiple setting interfaces (e.g., click multiple times) to locate a desired setting. For example, if a user wants to adjust the content restrictions on a television device, the user may have to make a relatively high number of selections to locate the setting.

SUMMARY

In some aspects, the techniques described herein relate to a method including: identifying at least one dynamic setting for a television device by selecting at least one television setting from a plurality of television settings using a plurality of signals relating to setting usage history, the plurality of signals including a usage of the plurality of television settings by other users of television devices; receiving information that identifies the at least one dynamic setting; and displaying the at least one dynamic setting on a user interface of the television device, the at least one dynamic setting being displayed in a location that is different from a setting interface.

In some aspects, the techniques described herein relate to a television device including: at least one processor; and a non-transitory computer-readable medium storing executable instructions that cause the at least one processor to execute operations, the operations including: identifying a plurality of dynamic settings for a television device by selecting a subset of a plurality of television settings using a plurality of signals relating to setting usage history, the plurality of signals including a usage of the plurality of television settings by other users of television devices; receiving information that identifies the plurality of dynamic settings; displaying a dynamic setting icon on a user interface of the television device; displaying a setting icon on the user interface; in response to a selection to the setting icon, displaying a setting interface with at least a portion of the plurality of television settings; and in response to a selection of the dynamic setting icon, displaying a list of the plurality of dynamic settings.

In some aspects, the techniques described herein relate to a non-transitory computer-readable medium storing executable instructions that cause at least one processor to execute operations, the operations including: identifying a plurality of dynamic settings for a television device by selecting a subset of a plurality of television settings using a plurality of signals relating to setting usage history, the plurality of signals including a usage of the plurality of television settings by other users of television devices, recency of a television setting that is used by a user of the television device, and a number of times the television setting is used by the user of the television device; receiving information that identifies the plurality of dynamic settings; displaying a dynamic setting icon on a user interface of the television device; displaying a setting icon on the user interface; in response to a selection to the setting icon, displaying a setting interface with at least a portion of the plurality of television settings; and in response to a selection of the dynamic setting icon, displaying a list of the plurality of dynamic settings.

The details of one or more implementations are set forth in the accompanying drawings and the description below. Other features will be apparent from the description and drawings, and from the claims.

BRIEF DESCRIPTION OF THE DRAWINGS

FIG. 3 is a flowchart depicting example operations of identifying and displaying dynamic settings on a television device according to an aspect.

DETAILED DESCRIPTION

Figure 1:
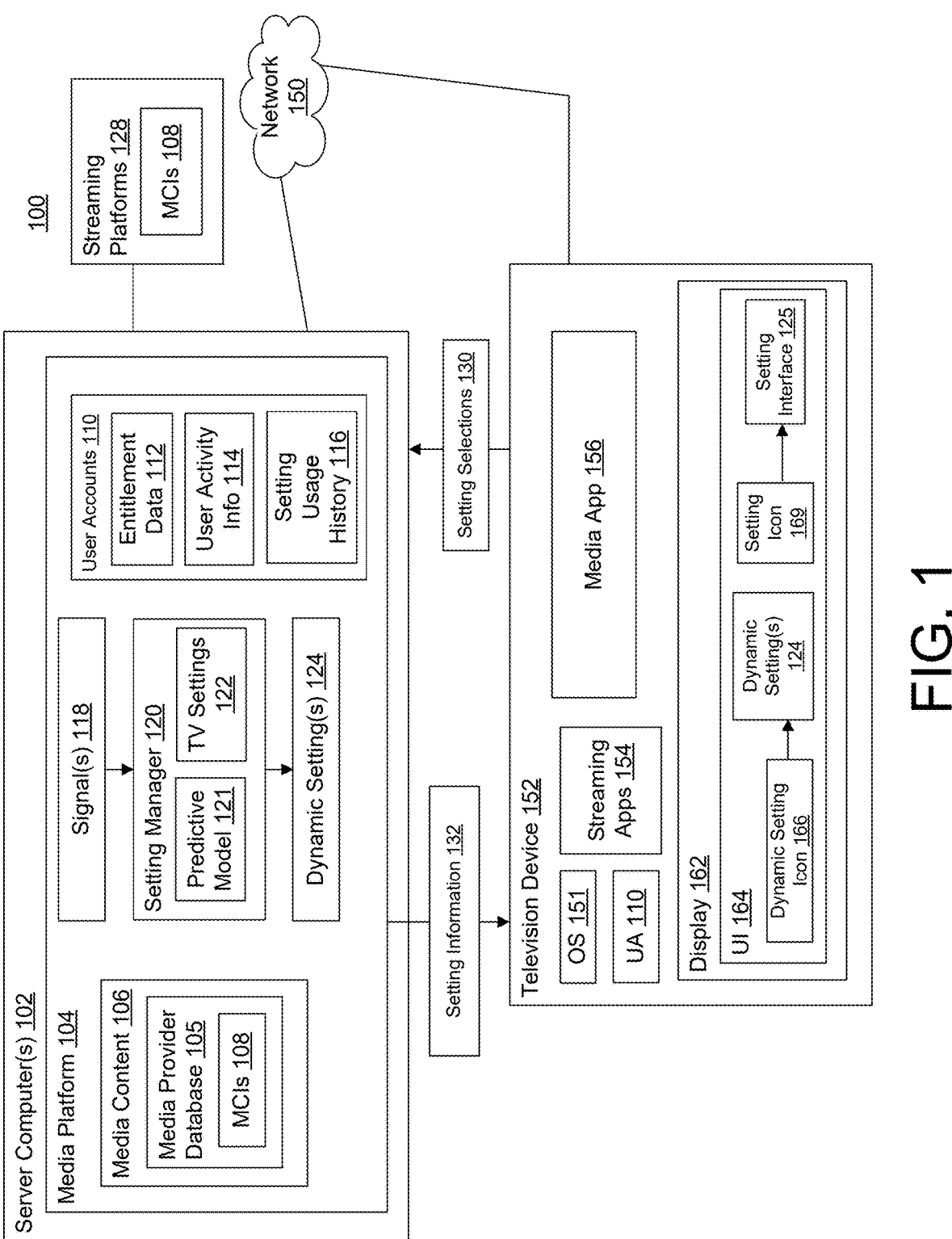
FIG. 1 illustrates a system that identifies and provides one or more dynamic settings (e.g., a subset of television settings) for user selection in a user interface of a television device according to an aspect.

The disclosure relates to a setting manager of a media platform that programmatically identifies one or more dynamic settings of a television device by selecting one or more television settings from a plurality of existing television settings using one or more signals relating to setting usage. In some examples, the setting manager may select, and rank television settings using the signal(s). The signals(s) may include setting usage history associated with the user of the television device and/or setting usage history associated with other users of television devices associated with the media platform (e.g., television devices that have user accounts registered with the media platform). In some examples, the setting usage may be stored at a central location, e.g., one or more server computers. In some examples, the setting manager may receive setting selections from computing devices having user accounts associated with a media platform. The signals(s) may include one or more signals that are predicted by the media platform using information associated with a user's activity on the media platform and/or other users' activity on the media platform. In some examples, the signal(s) may include recency of a television setting that is used by a user, the number of times a television setting is used by the user, and/or a usage (e.g., global usage) of a television setting by users of television devices with user accounts of the media platform. In some examples, the setting manager includes a predictive model (e.g., a machine-learning model, a neural network, etc.) that receives the signal(s) as input(s) and identifies one or more existing television settings as dynamic settings.

A media application, executable by the television device, renders a user interface that identifies a plurality of media content items that are available for streaming on the television device. A media content item may be a show, program, movie, etc. Selection of a media content item from the application's user interface causes the media content item to be streamed on the television device. For example, in response to selection of a media content item from the user interface, the media application may initiate playback of the media content item. The media application may receive information about the dynamic setting(s) from the setting manager and may display the dynamic setting(s) in an area of the device's user interface that can be easily accessed by the user. In some examples, the dynamic setting(s) is displayed in a UI object or interface that is separate from a normal setting interface. In some examples, the dynamic setting(s) may be accessible from a user interface that is initially displayed when the media application is launched on the television device (e.g., a home screen). In some examples, the user interface includes a user element (UI) element (e.g., a dynamic setting icon) that, when selected, causes the display of a UI object with the dynamic settings. The UI object may be rendered on top of the content currently displayed by the user interface. In some examples, the UI element is a top-level icon. In some examples, the UI element is located proximate to (e.g., next to) a setting icon. The setting icon, when selected, causes the media application to render a setting interface with at least a portion of the plurality of television settings. However, selection to the dynamic setting icon causes the display of a shorter and more relevant list of television settings that were programmatically selected for the television device.

In some examples, the television device may periodically retrieve the information about the dynamic setting(s) from the setting manager (e.g., once a day, multiple times a day, once a week, etc.). In some examples, the television device may receive the information about the dynamic setting(s) over a network such as the Internet. The dynamic setting(s) may change over time. For example, at a first time, the television device may display a first dynamic setting and a second dynamic setting. However, the setting usage history associated with the user of the television device and/or associated with other users of television devices may indicate that the user or other users have selected other settings besides the first dynamic setting and the second dynamic setting. At a second time, the television device may retrieve and display a third dynamic setting and a fourth dynamic setting. These and other features are further described with reference to the figures.

FIG. 1 illustrates a system 100 that includes a media platform 104 executable by one or more server computers 102 and a media application 156 executable by a television device 152. The media platform 104 includes a setting manager 120 that identifies one or more dynamic settings 124 by selecting a subset of television settings (e.g., one or more television settings 122) from a plurality of existing television settings using one or more signals 118. In other words, the setting manager 120 may use the signal(s) 118 to select one or more television settings 122 as dynamic settings 124, which are accessible in an area that is separate from a setting interface 125. In some examples, the media application 156 may receive setting information 132 about the dynamic setting(s) 124 identified by the setting manager 120, and the media application 156 may display the dynamic setting(s) 124 on the user interface 164. The media application 156 may render a dynamic setting icon 166 on a user interface 164 of the television device 152, and, in response to a selection to the dynamic setting icon 166, the media application 156 may display a list of the dynamic setting(s) 124. The dynamic setting icon 166 may be a top-level navigation icon that, when selected, identifies the list of dynamic setting(s) 124. The dynamic setting(s) 124 may include television setting(s) 122 that may be likely used by a user based on setting usage history 116 of the user and/or other users of the media platform 104.

The media platform 104 may be a server-based television platform. In some examples, the media application 156 is (or is a subcomponent of) an operating system 151 of the television device 152. In some examples, the media application 156 is a native application (e.g., a standalone native application), which is preinstalled on the television device 152 or downloaded to the television device 152 from a digital media store (e.g., play store, application store, etc.). The media application 156 may be a client application. The media application 156 may communicate with the media platform 104 to identify media content 106 that is available for streaming to the television device 152. The media content 106 includes a plurality of media content items 108. In some examples, the media content 106 includes media content items 108 that are stored on the media platform 104 and streamed from the media platform 104 to the media application 156. In some examples, the media content 106 includes media content items 108 that are stored on one or more (other) streaming platforms 128 and streamed from the streaming platforms 128 to their respective streaming applications 154.

In some examples, the media application 156 is a media aggregator application that determines which providers (e.g., streaming platforms 128, associated streaming applications 154) the user has access rights to, and then identifies media content items 108, across those providers, in the user interface 164 for selection and playback. For example, the media application 156 (e.g., in conjunction with the media platform 104) may aggregate (e.g., combine, assemble, collect, etc.) information about media content 106 available for viewing (e.g., streaming) from multiple streaming platforms 128 and present the information in the user interface 164 (e.g., a single, unified user interface) so that a user can identify and/or search media content 106 across different streaming platforms (e.g., without having to search within each streaming application 154). In some examples, the media content 106 is referred to as media content items 108 (e.g., individual programs offered by streaming platforms 128). For example, each media content item 108 may be a program (e.g., a television show, a movie, a live broadcast, etc.) from the media platform 104 or another streaming platform 128. Instead of searching for media content items 108 on a first streaming application and media content items 108 on a second streaming application, the media application 156 may combine the media content items 108 together in one interface (e.g., user interface 164) so that a user can search across multiple streaming platforms 128 at once.

The media platform 104 may store user accounts 110, where each user account 110 stores information about a respective user. A user account 110 may be associated with a user of the television device 152. In some examples, the user account 110 is an account of the media platform 104 or the media application 156. A user account 110 may store entitlement data 112, user activity information 114, and setting usage history 116. The entitlement data 112 includes information that identifies which providers (e.g., streaming platforms 128, streaming applications 154) that the user account 110 has access rights to view content. In some examples, the access rights are determined based on the user account 110 (e.g., whether the user has subscribed to one or more streaming applications 154), which streaming applications 154 are installed on the television device 152 and/or if the user has accessed (e.g., logged-into) a user account associated with those streaming applications 154. In response to certain user activity regarding media content items 108, the media platform 104 may update the user activity information 114 with information about the activity such as a content identifier, the date/time, and/or the watch duration of the media content item, etc. The setting usage history 116 may store which television setting 122 have been interacted with (e.g., changed, adjusted), along with the time and/date of the interaction.

In some examples, a media content item 108 may correspond to a digital video file, which may be stored on the streaming platforms 128 (including the media platform 104) and/or the television device 152. In some examples, the media platform 104 is also considered a streaming platform 128, which may store and provide digital video files for streaming or downloading. The digital video file may include video and/or audio data that corresponds to a particular media content item 108. In some examples, the media platform 104 is configured to communicate with the streaming platforms 128 to identify which media content 106 is available on the streaming platforms 128 and may update a media provider database 105 to identify the media content items 108 offered by the streaming platforms 128.

For example, the media platform 104 may communicate, over a network 150, with the streaming platforms 128 to identify which media content 106 is available to be streamed by television devices 152 and update a media provider database 105. The media platform 104 may identify a set or multiple sets of media content items 108 (e.g., across the various streaming platforms 128) as recommendations to a user of the media application 156. In some examples, the media platform 104 may determine whether the user of the media application 156 has rights (e.g., stored as entitlement data 112) to stream media content 106 from one or more of the streaming platforms 128 (e.g., whether the user has subscribed to access media content 106 from the streaming platform(s) 128), and, if so, may include those media content items 108 as candidates in a selection (e.g., ranking) mechanism to potentially be displayed in the user interface 164 of the media application 156.

The media application 156 includes a user interface 164 that identifies media content items 108 for selection and playback on the television device 152. In response to selection of a media content item 108, the media application 156 may initiate playback of the media content item 108 on a display 162 of the television device 152. In some examples, in response to selection of the media content item 108, the media platform 104 streams the media content item 108 to the media application 156, which causes the media application 156 to display the media content item 108 on the display 162. In some examples, in response to selection of the media content item 108 from the user interface 164 of the media application 156, the media application 156 causes the content's underlying streaming application 156 to playback the media content item 108.

In some examples, selection of a media content item 108 from the user interface 164 may cause the media application 156 to launch a streaming application 154 (e.g., using a content deep link) associated with the streaming application 154. In some examples, selection of a media content item 108 from the user interface 164 causes the media application 156 to render another user interface (e.g., item's landing page), and further selection of the media content item 108 from the item's landing page causes the media application 156 to launch the underlying streaming application 154. In some examples, the media content item 108 may be associated with a specific provider in which the media content item 108 is streamed from a streaming platform 128 (e.g., the media platform 104 itself or another streaming platform 128). In some examples, the user can control the playback of the media content item 108 from the corresponding streaming application 154.

A content deep link, corresponding to a media content item 108, may be an identifier that identifies the location of the media content item 108 in the streaming application 154. The media application 156 may transfer the content deep link to the corresponding streaming application 154. In some examples, the content deep link identifies a specific landing page (e.g., an interface) within the streaming application 154 that corresponds to the media content item 108. In some examples, the content deep link is an operating system intent. In some examples, the content deep link is a uniform resource locator (URL). In some examples, the content deep link includes a URL format.

Streaming (or playback) of the media content item 108 may refer to the transmission of the contents of a video file (e.g., media assets) from a streaming platform 128 or the media platform 104 to the television device 152 that displays the contents of the video file. In some examples, streaming (or playback) of the media content item 108 may refer to a continuous video stream that is transferred from one place to another place in which a received portion of the video stream is displayed while waiting for other portions of the video stream to be transferred. In some examples, after the media content item 108 is published on the media platform 104 (e.g., is live), the television device 152 may stream or download the contents of the video file.

In some examples, the user interface 164 may identify a plurality of media content items 108, which may be selected by the media platform 104 from the media provider database 105 based at least in part on information representing the user's activity information 114 (e.g., the user's search queries, search results, previous watch history, purchase history, application usage history, application installation history, user actions on the network-connected television device, physical activities of the user, etc.). The media application 156 may be associated with a user account 110, and the user account 110 may store the information representing the user's interests and activities (e.g., user activity information 114), and the media platform 104 may use this information to select and present the media content items 108 in the user interface 164. In some examples, the media content items 108 may be organized as a plurality of clusters based on one or more categories, such as content type (e.g., "Action Movies"), viewing history (e.g., "Because You watched Movie ABC"), release time (e.g., "Trending"), and the like. In some examples, the media content items 108 provided by different streaming platforms 128 (e.g., action movies from two different streaming platforms 128) can be recommended in the same cluster. In some examples, the user interface 164 may include tabbed interfaces, where one of the tabbed interfaces includes personalized media content that is organized as a plurality of clusters based on one or more categories, such as release time (e.g., "This Week," "Next week," "Next Month," etc.), user action and user application interaction, native app usage (e.g., items that are "From App ABC"), etc.

It is noted that a user of the media application 156 may be provided with controls allowing the user to make an election as to both if and when the system 100 may enable the collection of information representing the user's interests and activities. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user of the media application 156 may have control over what information is collected about the user, how that information is used, and what information is provided to the user and/or to the server computer 102.

The media platform 104 includes a setting manager 120 configured to identify one or more television settings 122 as dynamic setting(s) 124. In other words, the setting manager 120 may select a subset of television settings 122 as dynamic setting(s) 124 to be displayed in an area of the user interface 164 that is separate from the setting interface 125. For example, the dynamic setting(s) 124 may be found in the setting interface 125. However, instead of searching through the setting interface 125, the dynamic setting(s) 124 can be displayed in an easily accessible area (e.g., by selecting a top-level navigation icon (e.g., the dynamic setting icon 166)). The setting manager 120 may programmatically identify one or more dynamic settings 124 by selecting one or more television settings 122 from a plurality of existing television settings 122 using one or more signals 118. In some examples, the setting manager may select, and rank television settings 122 using the signal(s) 118. In some examples, the signal(s) 118 include first signals that are used to select the dynamic settings 124, and second signals that are used to rank the dynamic settings, where the second signals include at least one signal that is not included in the first signals. In some examples, the signal(s) 118 are used to both select and rank the dynamic settings 124.

The signals(s) 118 may include setting usage history 116 associated with the user of the television device 152 and/or setting usage history 116 associated with other users of television devices 152. The signals(s) 118 may include one or more signals that are predicted by the media platform 104 using information associated with a user's activity on the media platform 104 and/or other users' activity on the media platform 104. In some examples, the signal(s) 118 may include recency of a television setting 122 that is used by a user (e.g., which television settings 122 were adjusted by the user within a threshold period of time such as one day, one week, one month, etc.). In some examples, the signal(s) 118 include a television setting 122 that was interacted with by a user and time information (e.g., date and/or time) of the interaction. In some examples, the signal(s) 118 includes the number of times a setting is used by the user. In some examples, the signal(s) 118 includes a global usage of a setting by users of a media platform 104. The global usage may indicate the amount of interactions by users (e.g., all users) of the media platform 104.

In some examples, the setting manager 120 includes a predictive model 121 that receives the signal(s) 118 as input(s) to identify one or more existing television settings 122 as dynamic settings 124. In some examples, the predictive model 121 includes a machine-learning (ML) model. In some examples, the predictive model 121 includes a neural network.

The media platform 104 may receive and store setting selections 130 in the setting usage history 116 for a user account 110 associated with the television device 152 and the media platform 104. The media application 156 may transmit information about the setting selections 130 made by the user. For example, if a user has interacted with (e.g., changed) a television setting 122 on the television device 152, the media platform 104 may receive, over a network 150, information about the setting selection 130, and store the setting selection 130 in the setting usage history 116. The media platform 104 may store the setting selections 130 across each of a plurality of television devices 152 (e.g., all television devices 152) with a user account 110 associated with the media platform 104. For example, the media platform 104 may store the setting usage history 116 for the user of the television device 152, and the setting usage history 116 for other users of television devices 152 with user accounts 110 associated with the media platform 104.

The setting usage history 116 may include information about which television settings 122 have been interacted with by a user, the date/time of the interaction, and, in some examples, the location of the television device 152. In some examples, the setting usage history 116 may be stored in conjunction with device information that identifies the type of television device 152 (e.g., the make and model), the underlying operating system 151, and/or other attributes of the television device 152. In some examples, the setting usage history 116 is stored at the media platform 104. In some examples, the setting usage history 116 is stored locally at the television device 152.

The media application 156 may receive setting information 132 about the dynamic setting(s) 124 from the setting manager 120 and may display the dynamic setting(s) 124 in an area of the device's user interface 164 that can be easily accessed by the user. In some examples, the dynamic setting(s) 124 may be accessible from a user interface 164 that is initially displayed when the media application 156 is launched on the television device 152. In some examples, the user interface 164 includes a dynamic setting icon 166 that, when selected, causes the display of the dynamic settings 124. In some examples, the dynamic setting icon 166 is a top-level icon. In some examples, the dynamic setting icon 166 is located proximate to (e.g., next to) a setting icon 169. In response to a selection to the setting icon 169, the media application 156 renders a setting interface 125 to enable the user to browse through, select, and make selections to the television settings 122.

In some examples, the media application 156 may periodically retrieve the setting information 132 about the dynamic setting(s) 124 from the setting manager 120 (e.g., once a day, multiple times a day, once a week, etc.). In some examples, the media application 156 may receive the setting information 132 about the dynamic setting(s) 124 over a network 150 such as the Internet. The dynamic setting(s) 124 may change over time. For example, at a first time, the media application 156 may display a first dynamic setting and a second dynamic setting. However, the setting usage history 116 associated with the user of the television device 152 and/or associated with other users of television devices 152 may indicate that the user or other users have selected other television settings 122 besides the first dynamic setting and the second dynamic setting. At a second time, the media application 156 may retrieve and display a third dynamic setting and a fourth dynamic setting.

The television device 152 includes one or more processors, one or more memory devices, and an operating system 151 configured to execute (or assist with executing) one or more streaming applications 154. The one or more memory devices may be a non-transitory computer-readable medium storing executable instructions that cause the one or more processors to execute operations discussed herein. The television device 152 may be any type of user device. In some examples, the television device 152 is a television device (e.g., a smart television). In some examples, the television device 152 is a smartphone, a laptop computer, a desktop computer, a gaming console, and/or a wearable device such as a head-mounted television device. In some examples, the television device 152 is an augmented reality (AR) or virtual reality (VR) device. The streaming applications 154 may include a media application 156 configured to communicate, over the network, 150, with a media platform 104 executable by one or more server computers 102. In some examples, the media application 156 is a program that is part of the operating system 151. In some examples, the media application 156 is a separate standalone application that is downloaded and installed on the operating system 151. In some examples, the media application 156 may execute operation(s) discussed with reference to the operating system 151 (and/or vice versa). In some examples, the television device 152 is not a smart television, but is converted to a smart television when connected to a casting device, where the casting device is configured to connect to the network 150 and execute an operating system 151 configured to execute streaming applications 154, including the media application 156.

In some examples, the operating system 151 is a browser application. A browser application is a web browser configured to access information on the Internet and may launch one or more browser tabs in the context of one or more browser windows. In some examples, the operating system 151 is a Linux-based operating system. In some examples, the operating system 151 is a mobile operating system that is also configured to execute on smaller devices (e.g., smartphones, tablets, wearables, etc.).

The server computer 102 may be computing devices that take the form of a number of different devices, for example a standard server, a group of such servers, or a rack server system. In some examples, the server computer 102 may be a single system sharing components such as processors and memories. The network 150 may include the Internet and/or other types of data networks, such as a local area network (LAN), a wide area network (WAN), a cellular network, satellite network, or other types of data networks. The network 150 may also include any number of computing devices (e.g., computer, servers, routers, network switches, etc.) that are configured to receive and/or transmit data within network 150. Network 150 may further include any number of hardwired and/or wireless connections.

The server computer 102 may include one or more processors formed in a substrate, an operating system (not shown) and one or more memory devices. The memory devices may represent any kind of (or multiple kinds of) memory (e.g., RAM, flash, cache, disk, tape, etc.). In some examples (not shown), the memory devices may include external storage, e.g., memory physically remote from but accessible by the server computer 102. The server computer 102 may include one or more modules or engines representing specially programmed software.

Figure 2A:
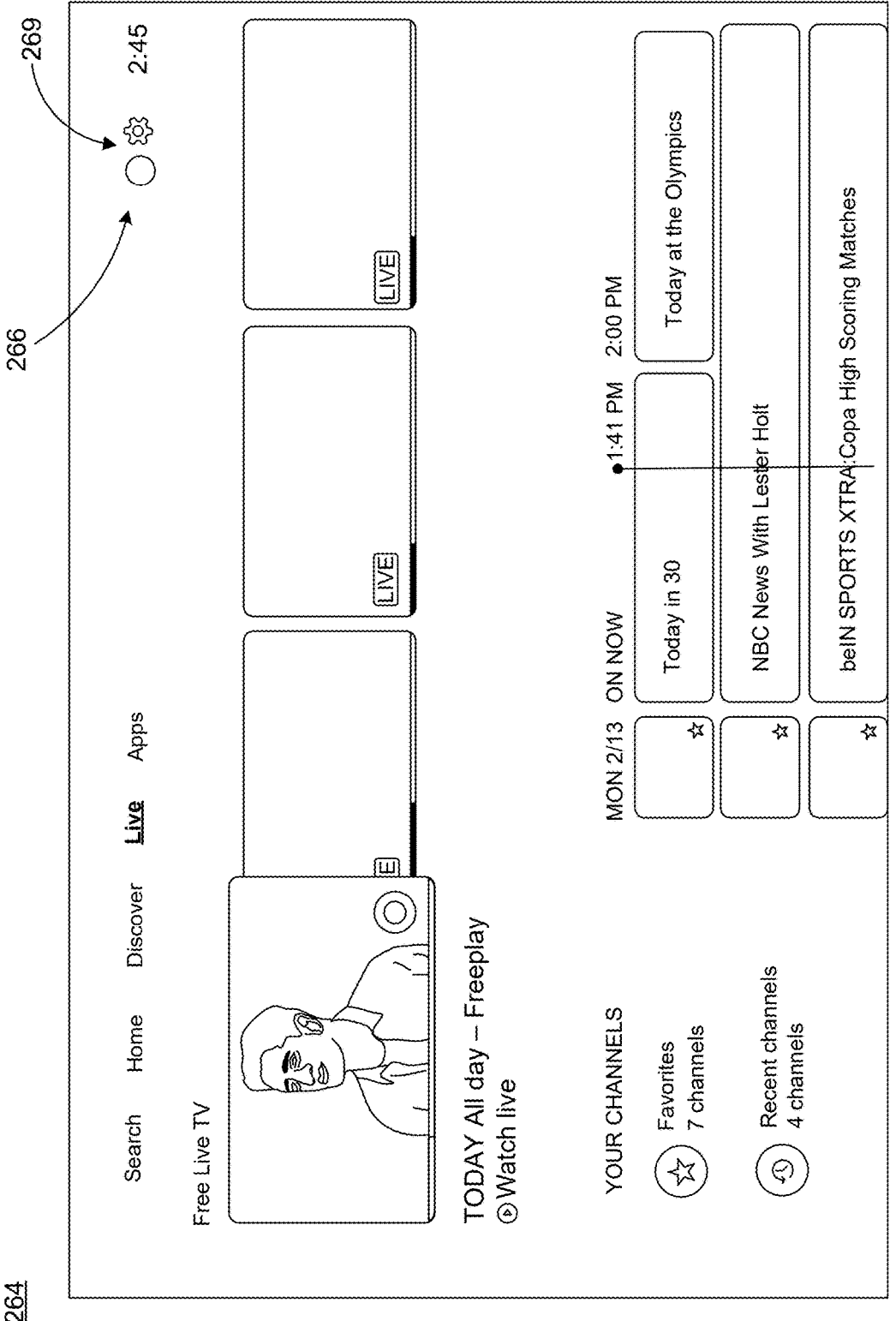
FIG. 2A illustrates an example of a user interface with a dynamic setting icon, which, when selected, displays a list of dynamic settings according to an aspect.
Figure 2B:
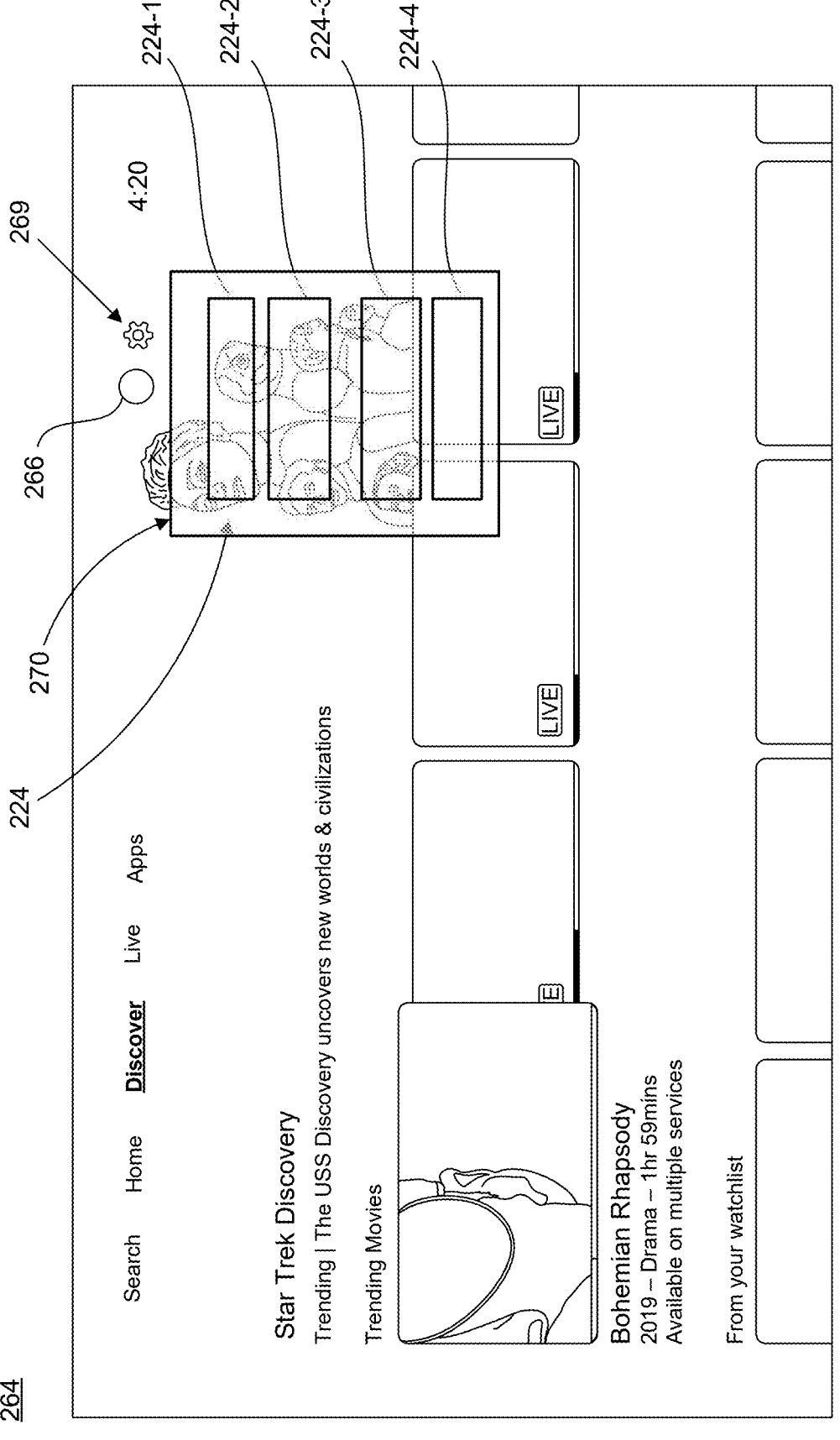
FIG. 2B illustrates an example of a user interface with a dynamic setting icon, which, when selected, displays a list of dynamic settings according to another aspect.

FIGS. 2A and 2B illustrate example user interfaces 264 for displaying dynamic settings 224 according to an aspect. The example user interfaces 264 of FIGS. 2A and 2B may be examples of user interfaces (e.g., user interface 164 of FIG. 1) provided by the system 100 of FIG. 1. As shown in FIG. 2A, a media application may render a user interface 264 with a plurality of tabs (e.g., search tab, home tab, live tab, discover tab, an apps tab, etc.). The user interface 264 includes a setting icon 269 that, when selected, causes a display of a setting interface to enable the user to find and adjust a television setting. The user interface 264 also includes a dynamic setting icon 266 that, when selected, causes a display of a UI object 270 with a list of dynamic settings 224 such as dynamic setting 224-1, dynamic setting 224-2, dynamic setting 224-3, and dynamic setting 224-4.

FIG. 3 is a flowchart 300 depicting example operations of a system that identifies and displays dynamic settings according to an aspect. The flowchart 300 may depict operations of a computer-implemented method. The flowchart 300 may depict operations of a non-transitory computer-readable medium having executable instructions that when executed by one or more processors cause the one or more processors to execute the operations of the flowchart 300. Although the flowchart 300 is explained with respect to the system 100 of FIG. 1, the flowchart 300 may be applicable to any of the implementations discussed herein. Although the flowchart 300 of FIG. 3 illustrates the operations in sequential order, it will be appreciated that this is merely an example, and that additional or alternative operations may be included. Further, operations of FIG. 3 and related operations may be executed in a different order than that shown, or in a parallel or overlapping fashion.

Operation 302 includes identifying at least one dynamic setting for a television device by selecting at least one television setting from a plurality of television settings using a plurality of signals relating to setting usage history, the plurality of signals including a usage of the plurality of television settings by other users of television devices. Operation 304 includes receiving information that identifies the at least one dynamic setting. Operation 306 includes displaying the at least one dynamic setting on a user interface of the television device, the at least one dynamic setting being displayed in a location that is different from a setting interface.

Clause 1. A method comprising: identifying at least one dynamic setting for a television device by selecting at least one television setting from a plurality of television settings using a plurality of signals relating to setting usage history, the plurality of signals including a usage of the plurality of television settings by other users of television devices; receiving information that identifies the at least one dynamic setting; and displaying the at least one dynamic setting on a user interface of the television device, the at least one dynamic setting being displayed in a location that is different from a setting interface.

Clause 2. The method of clause 1, wherein identifying the at least one dynamic setting includes: determining, by a predictive model, the at least one dynamic setting by using the plurality of signals as an input to the predictive model.

Clause 3. The method of clause 1, further comprising: displaying a dynamic setting icon on the user interface; and in response to a selection of the dynamic setting icon, displaying a list of the at least one dynamic setting.

Clause 4. The method of clause 3, further comprising: displaying a setting icon on the user interface, the dynamic setting icon being displayed adjacent to the setting icon; and in response to a selection to the setting icon, displaying a setting interface with at least a portion of the plurality of television settings.

Clause 5. The method of clause 1, wherein the plurality of signals includes include first signals, the method further comprising: identifying a plurality of dynamic settings using the first signals; generating a ranked list by ranking the plurality of dynamic settings using second signals, the second signals including at least one signal that is different from the first signals; and displaying the ranked list on the user interface.

Clause 6. The method of clause 1, wherein the at least one dynamic setting includes a first dynamic setting, the method further comprising: identifying a second dynamic setting by selecting another television setting from the plurality of television settings; receiving information that identifies the second dynamic setting; and displaying the second dynamic setting in replace of the first dynamic setting in the user interface.

Clause 7. The method of clause 1, wherein the plurality of signals includes recency of a television setting that is used by a user of the television device.

Clause 8. The method of clause 7, wherein the plurality of signals includes a number of times a television setting is used by a user of the television device.

Clause 9. A television device comprising: at least one processor; and a non-transitory computer-readable medium storing executable instructions that cause the at least one processor to execute operations, the operations comprising: identifying a plurality of dynamic settings for a television device by selecting a subset of a plurality of television settings using a plurality of signals relating to setting usage history, the plurality of signals including a usage of the plurality of television settings by other users of television devices; receiving information that identifies the plurality of dynamic settings; displaying a dynamic setting icon on a user interface of the television device; displaying a setting icon on the user interface; in response to a selection to the setting icon, displaying a setting interface with at least a portion of the plurality of television settings; and in response to a selection of the dynamic setting icon, displaying a list of the plurality of dynamic settings.

Clause 10. The television device of clause 9, wherein the dynamic setting icon is displayed adjacent to the setting icon such that another icon is not disposed between the dynamic setting icon and the setting icon.

Clause 11. The television device of clause 9, wherein the operations further comprise: determining, by a predictive model, the plurality of dynamic settings by using the plurality of signals as an input to the predictive model, the predictive model including a neural network.

Clause 12. The television device of clause 9, wherein the plurality of signals includes include first signals, wherein the operations further comprise: identifying the plurality of dynamic settings using the first signals; generating a ranked list by ranking the plurality of dynamic settings using second signals, the second signals including at least one signal that is different from the first signals; and displaying the ranked list on the user interface.

Clause 13. The television device of clause 9, wherein the plurality of dynamic settings includes a first subset of the plurality of television settings, wherein the operations further comprise: identifying a second subset of the plurality of television settings, the second subset including at least one television setting that is not included in the first subset; receiving information that identifies the second subset; and displaying the second subset as the plurality of dynamic settings.

Clause 14. The television device of clause 9, wherein the plurality of signals includes recency of a television setting that is used by a user of the television device.

Clause 15. The television device of clause 9, wherein the plurality of signals includes a number of times a television setting is used by a user of the television device.

Clause 16. A non-transitory computer-readable medium storing executable instructions that cause at least one processor to execute operations, the operations comprising: identifying a plurality of dynamic settings for a television device by selecting a subset of a plurality of television settings using a plurality of signals relating to setting usage history, the plurality of signals including a usage of the plurality of television settings by other users of television devices, recency of a television setting that is used by a user of the television device, and a number of times the television setting is used by the user of the television device; receiving information that identifies the plurality of dynamic settings; displaying a dynamic setting icon on a user interface of the television device; displaying a setting icon on the user interface; in response to a selection to the setting icon, displaying a setting interface with at least a portion of the plurality of television settings; and in response to a selection of the dynamic setting icon, displaying a list of the plurality of dynamic settings.

Clause 17. The non-transitory computer-readable medium of clause 16, wherein the dynamic setting icon is displayed adjacent to the setting icon such that another icon is not disposed between the dynamic setting icon and the setting icon.

Clause 18. The non-transitory computer-readable medium of clause 16, wherein the operations further comprising: determining, by a predictive model, the plurality of dynamic settings by using the plurality of signals as an input to the predictive model, the predictive model including a neural network.

Clause 19. The non-transitory computer-readable medium of clause 16, wherein the plurality of signals includes include first signals, wherein the operations further comprise: identifying the plurality of dynamic settings using the first signals; generating a ranked list by ranking the plurality of dynamic settings using second signals, the second signals including at least one signal that is different from the first signals; and displaying the ranked list on the user interface.

Clause 20. The non-transitory computer-readable medium of clause 16, wherein the plurality of dynamic setting includes a first subset of the plurality of television settings, wherein the operations further comprise: identifying a second subset of the plurality of television settings, the second subset including at least one television setting that is not included in the first subset; receiving information that identifies the second subset; and displaying the second subset as the plurality of dynamic settings.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are remote from each other and typically interact through a communication network. The relationship of client and server arises by virtue of computer programs running on the respective computers and having a client-server relationship with each other.

In this specification and the appended claims, the singular forms "a," "an" and "the" do not exclude the plural reference unless the context clearly dictates otherwise. Further, conjunctions such as "and," "or," and "and/or" are inclusive unless the context clearly dictates otherwise. For example, "A and/or B" includes A alone, B alone, and A with B. Further, connecting lines or connectors shown in the various figures presented are intended to represent example functional relationships and/or physical or logical couplings between the various elements. Many alternative or additional functional relationships, physical connections or logical connections may be present in a practical device. Moreover, no item or component is essential to the practice of the implementations disclosed herein unless the element is specifically described as "essential" or "critical".

Terms such as, but not limited to, approximately, substantially, generally, etc. are used herein to indicate that a precise value or range thereof is not required and need not be specified. As used herein, the terms discussed above will have ready and instant meaning to one of ordinary skill in the art.

Moreover, use of terms such as up, down, top, bottom, side, end, front, back, etc. herein are used with reference to a currently considered or illustrated orientation. If they are considered with respect to another orientation, it should be understood that such terms must be correspondingly modified.

Although certain example methods, apparatuses and articles of manufacture have been described herein, the scope of coverage of this patent is not limited thereto. It is to be understood that terminology employed herein is for the purpose of describing particular aspects and is not intended to be limiting. On the contrary, this patent covers all methods, apparatus and articles of manufacture fairly falling within the scope of the claims of this patent.

What is claimed is:

1. A method comprising:
selecting at least one dynamic setting for a television device from among a plurality of default television settings using a plurality of signals relating to usage history of the plurality of default television settings, the plurality of signals including a usage of the plurality of default television settings by other users of television devices, the plurality of default television settings being accessible via a setting icon;
receiving information that identifies the at least one dynamic setting; and
displaying the at least one dynamic setting on a user interface of the television device, the at least one dynamic setting being accessible via a different icon than the setting icon.

2. The method of claim 1, wherein selecting the at least one dynamic setting includes:
determining, by a predictive model, the at least one dynamic setting by using the plurality of signals as an input to the predictive model.

3. The method of claim 1, further comprising:
displaying a dynamic setting icon on the user interface; and
in response to a selection of the dynamic setting icon, displaying a list of the at least one dynamic setting.

4. The method of claim 3, further comprising:
displaying the setting icon on the user interface, the dynamic setting icon being displayed adjacent to the setting icon; and
in response to a selection of the setting icon, displaying a setting interface with at least a portion of the plurality of default television settings.

5. The method of claim 1, wherein the plurality of signals include first signals, the method further comprising:
identifying a plurality of dynamic settings using the first signals;
generating a ranked list by ranking the plurality of dynamic settings using second signals, the second signals including at least one signal that is different from the first signals; and
displaying the ranked list on the user interface.

6. The method of claim 1, wherein the at least one dynamic setting includes a first dynamic setting, the method further comprising:
selecting a second dynamic setting from among the plurality of default television settings;
receiving information that identifies the second dynamic setting; and
displaying the second dynamic setting in place of the first dynamic setting in the user interface.

7. The method of claim 1, wherein the plurality of signals includes recency of use of a television setting by a user of the television device.

8. The method of claim 7, wherein the plurality of signals includes a number of times a television setting is used by a user of the television device.

9. A television device comprising:
at least one processor; and
a non-transitory computer-readable medium storing executable instructions that cause the at least one processor to execute operations, the operations comprising:
selecting a plurality of dynamic settings for a television device by selecting a subset of a plurality of default television settings using a plurality of signals relating to usage history of the plurality of default television settings, the plurality of signals including a usage of the plurality of default television settings by other users of television devices;
receiving information that identifies the plurality of dynamic settings;

displaying a dynamic setting icon on a user interface of the television device;

displaying a setting icon on the user interface;

in response to a selection of the setting icon, displaying a list of at least a portion of the plurality of default television settings; and in response to a selection of the dynamic setting icon, displaying a list of the plurality of dynamic settings.

10. The television device of claim 9, wherein the dynamic setting icon is displayed adjacent to the setting icon such that another icon is not disposed between the dynamic setting icon and the setting icon.

11. The television device of claim 9, wherein the operations further comprise:

determining, by a predictive model, the plurality of dynamic settings by using the plurality of signals as an input to the predictive model, the predictive model including a neural network.

12. The television device of claim 9, wherein the plurality of signals includes include first signals, wherein the operations further comprise:

selecting the plurality of dynamic settings using the first signals;

generating a ranked list by ranking the plurality of dynamic settings using second signals, the second signals including at least one signal that is different from the first signals; and displaying the ranked list on the user interface.

13. The television device of claim 9, wherein the plurality of dynamic settings includes a first subset of the plurality of default television settings, wherein the operations further comprise:

identifying a second subset of the plurality of default television settings, the second subset including at least one television setting that is not included in the first subset;

receiving information that identifies the second subset; and displaying the second subset as the plurality of dynamic settings.

14. The television device of claim 9, wherein the plurality of signals includes recency of a use of television setting a user of the television device.

15. The television device of claim 9, wherein the plurality of signals includes a number of times a television setting is used by a user of the television device.

16. A non-transitory computer-readable medium storing executable instructions that cause at least one processor to execute operations, the operations comprising:

selecting a plurality of dynamic settings for a television device by selecting a subset of a plurality of default television settings using a plurality of signals relating to usage history of the plurality of default television settings, the plurality of signals including a usage of the plurality of default television settings by other users of television devices, recency of use of a television setting by a user of the television device, and a number of times the television setting is used by the user of the television device;

receiving information that identifies the plurality of dynamic settings;

displaying a dynamic setting icon on a user interface of the television device;

displaying a setting icon on the user interface;

in response to a selection of the setting icon, displaying a list of at least a portion of the plurality of default television settings; and in response to a selection of the dynamic setting icon, displaying a list of the plurality of dynamic settings.

17. The non-transitory computer-readable medium of claim 16, wherein the dynamic setting icon is displayed adjacent to the setting icon such that another icon is not disposed between the dynamic setting icon and the setting icon.

18. The non-transitory computer-readable medium of claim 16, wherein the operations further comprising:

determining, by a predictive model, the plurality of dynamic settings by using the plurality of signals as an input to the predictive model, the predictive model including a neural network.

19. The non-transitory computer-readable medium of claim 16, wherein the plurality of signals includes include first signals, wherein the operations further comprise:

identifying the plurality of dynamic settings using the first signals;

generating a ranked list by ranking the plurality of dynamic settings using second signals, the second signals including at least one signal that is different from the first signals; and displaying the ranked list on the user interface.

20. The non-transitory computer-readable medium of claim 16, wherein the plurality of dynamic settings includes a first subset of the plurality of default television settings, wherein the operations further comprise:

identifying a second subset of the plurality of default television settings, the second subset including at least one television setting that is not included in the first subset;

receiving information that identifies the second subset; and displaying the second subset as the plurality of dynamic settings.

21. The method of claim 1, wherein the at least one dynamic setting allows a user to adjust a setting associated with the television device.

* * * * *